(12) United States Patent
Johansson

(10) Patent No.: US 8,164,221 B2
(45) Date of Patent: Apr. 24, 2012

(54) CONTROLLED SERIES COMPENSATOR AND METHOD

(75) Inventor: Nicklas Johansson, Stockholm (SE)

(73) Assignee: ABB Technology Ltd., Zürich (CH)

( * ) Notice: Subject to any disclaimer, the term of this patent is extended or adjusted under 35 U.S.C. 154(b) by 827 days.

(21) Appl. No.: 12/278,026

(22) PCT Filed: Feb. 1, 2007

(86) PCT No.: PCT/SE2007/050054

§ 371 (c)(1),
(2), (4) Date: Nov. 18, 2008

(87) PCT Pub. No.: WO2007/089208

PCT Pub. Date: Aug. 9, 2007

(65) Prior Publication Data

US 2009/0200872 A1     Aug. 13, 2009

Related U.S. Application Data

(60) Provisional application No. 60/763,922, filed on Feb. 1, 2006.

(51) Int. Cl.
*H02J 3/24* (2006.01)
(52) U.S. Cl. .......................................... 307/102; 307/98
(58) Field of Classification Search .................... 307/98, 307/102, 125; 323/210, 211
See application file for complete search history.

(56) References Cited

U.S. PATENT DOCUMENTS

| | | | | |
|---|---|---|---|---|
| 5,621,305 | A | * | 4/1997 | Clark et al. ................... 323/210 |
| 6,559,561 | B1 | | 5/2003 | Angquist |
| 2006/0287737 | A1 | * | 12/2006 | Karlsson et al. ................ 700/28 |

OTHER PUBLICATIONS

Choi, S.S., et al., "Suppression of transmission system oscillations by thyristor-controlled series compensation," *IEE Proc.-Gener. Transm. Distrib.*, vol. 143, No. 1, Jan. 1996.
International Search Report, dated May 3, 2007, issued in Counterpart Application No. PCT/SE2007/050054.
Written Opinion of the International Searching Autority, dated May 3, 2007, issued in Counterpart Application No. PCT/SE2007/050054.

* cited by examiner

*Primary Examiner* — Jared Fureman
*Assistant Examiner* — Carlos Amaya
(74) *Attorney, Agent, or Firm* — Venable LLP; Eric J. Franklin

(57) ABSTRACT

A control apparatus for a controlled series compensator including a plurality of reactance elements each having a rapid switch for connecting and disconnecting the reactance in series with an electric power transmission line. The apparatus also includes a steady state power flow controller. A damping controller is provides on the presence of an oscillation on the transmission line a first reactance insertion on the transmission line having a first duration of time trigged by a time instant that coincides with a peak in the power oscillation.

20 Claims, 3 Drawing Sheets

CONTROLLED SERIES COMPENSATOR AND METHOD

CROSS-REFERENCE TO RELATED APPLICATIONS

This application claims priority to U.S. provisional patent application 60/763,922 filed 1 Feb. 2006 and is the national phase under 35 U.S.C. §371 of PCT/SE2007/050054 filed 1 Feb. 2007.

TECHNICAL FIELD

The present invention concerns control of the power flow in an ac transmission system. More precisely the invention concerns an apparatus for damping of power oscillations in an ac transmission line. Especially the apparatus comprises a Controlled Series Compensator (CSC).

BACKGROUND OF THE INVENTION

Power utilities use a variety of technologies to reduce the impact of disturbances in the power grid to lower the risk of blackouts. Many of these are commonly referred to as Flexible AC Transmission System (FACTS) devices. A well known FACTS device is the controlled series compensator, CSC. A CSC commonly comprises a series connected reactance with a parallel branch containing a switch. The reactance may either be a capacitance or an inductance or a combination of the two. The switch may either be a mechanical switch or a semiconductor switch. Two well known such FACTS devices are the Thyristor Controlled Series Compensator (TCSC) and the Thyristor Switched Series Compensator (TSSC). A CSC is based on the principle of varying the power line series reactance in order to control power flows and enhance system stability. The most important phenomena which affect the stability of power systems are poorly damped low frequency electro-mechanical oscillations, first-swing instabilities and voltage instabilities.

Power oscillation damping is traditionally improved by the use of Power System Stabilizers (PSS) that act on the Automatic Voltage Regulators (AVR) which control the generators in the power system. The structure of the power system determines the effectiveness of the PSS. In some cases the damping of inter-area modes may be inadequate. In these cases supplementary damping may be added to the power system by installation of a FACTS device like the TCSC at a proper location. However, the design of an effective controller for such a damping device is complicated. The equations governing the oscillations in a power system are non-linear since the power flow on one transmission (in per unit) comprises a sine function of the voltage phase angle difference at the line ends; divided by the line reactance (in p.u). Further the power system parameters often change dramatically during the contingencies causing the power oscillation. Consequently a controller which offers a good performance in one mode of operating and one system configuration may be inadequate in another mode of operation or a second system configuration. This may result in a negative damping of the power oscillation, which ends up in a power system failure. Therefore the design of a damping controller must take into account several operating conditions as well as system configurations thus making it hard to find the optimal design.

From U.S. Pat. No. 6,559,561 (Angquist) a method and device for damping power oscillations in transmission lines is previously known. The object of the method is to provide fast and robust identification of a component of the power oscillation. Accordingly a priori knowledge of the expected frequency of the power oscillation is utilized for estimating the oscillating component of the oscillation without any annoying influence of the simultaneous mean-power change and oscillations with deviating frequency. Depending on what kind of actuator that is utilized for the damping, an additional adaptation of the damping signal may be carried out. This applies, for example, when the actuator is in the form of a controllable series capacitor which is controlled with a reference value for its reactance, or in the form of a static reactive-power compensator which is controlled with a reference value for its sensitiveness.

Power systems with inherent inter-area oscillation modes are generally vulnerable to transient instability or to first-swing instability. This phenomenon may arise when a fault leads to an interrupted power transmission between a sending power grid area and a receiving power grid area. This leads to an advance in the generator phase angles in the sending area and a retardation of the phase angles for the machines in the receiving area. Once the fault has been cleared, the resulting difference in speed of the machines in the sending area and in the receiving area may lead to a loss of synchronism. The transfer capacity of the interconnection lines between the two areas is then insufficient after the fault. This type of event is in a first order approximation governed by a so called equal-area criterion. When the allowed maximum power transfer of an interconnecting line in a system is determined a high level of power transfer leads to a lower margin to transient instability.

SUMMARY OF THE INVENTION

A primary object of the present invention is to seek ways to improve the stability of an electric power network. A secondary object is to provide a general controller capable of controlling any device based on the principle of variation of the power line series reactance.

This object is achieved according to the invention by a control apparatus or by a method.

According to the invention the objects are achieved by inserting an adaptively controlled reactance in an electric power transmission line connecting a first power grid area and a second power grid area. The control parameters are estimated from local measurements only. In order to estimate the parameters needed for the control a model of the transmission system has been developed and simplified. The model comprises a first power grid area and a second power grid area, each containing a plurality of rotating electric machines, connected by a transmission line. The transmission line comprises a first and second reactance and a first and second parallel current path. The first current path contains the controllable reactance and a second current path contains a representation of the reactances of all other parallel branches. By the knowledge of a steady state condition a new condition caused by a change in the controllable reactance means generates by local measurement parameters for controlling the variable reactance to damp the oscillation.

In an embodiment of the invention the controllable reactance comprises a controllable series compensator (CSC). A CSC contains a plurality of variable reactance means and a main controller for controlling the connection and disconnection of the reactance means. The CSC is installed in one of the interconnecting lines between the first and second power grid areas. Normally the CSC is used for optimizing the transfer capacity between the two power areas. Hence the main controller comprises a steady state power flow controller, a PI controller, to accommodate for the long term power flow control. According to the invention the main controller comprises a damping controller, which uses parameters estimated from responses in the active power in the CSC line to changes in the variable series reactance. In a power system characterized by one dominant mode of oscillation a power oscillation is damped by changing a selected line series reactance in one step of a certain magnitude at a carefully selected time instant. The necessary reactance magnitude is determined by the knowledge of the system parameters according to the model.

According to a development of the invention the power oscillation is eliminated in two discrete reactance steps separated in time. Using two discrete steps in reactance, an additional degree of freedom to choose the final level of line compensation is introduced. This circumstance is used to change the active power flow on the reactance controlled line to a pre-defined set-point at the same time as the power oscillation is damped.

According to a further development of the invention an enhanced stability improvement of the power system is provided by the CSC where the main controller further comprises a transient controller. In this embodiment a pre-programmed response during the first swing is used. The transient controller is triggered shortly after the occurrence of a contingency in the power system. When the transient controller is triggered, the inserted series reactance of the line is set to its maximum negative value (full capacitive compensation). By detecting a first peak in the line power the compensation is kept high until the current has decreased below a current limit level. By the expression "peak" is meant either positive or negative peak. The current limit level is the RMS current flowing through the line measured at the instant when the first positive or negative oscillation peak in the line power occurs after the contingency triggering the transient controller. In a further embodiment of the invention, upon initiation of the transient controller, the damping controller power flow set-point mentioned above is changed to a pre-defined (high) value.

A TCSC is used by way of example of a controlled series compensator controlled by a controller according to the invention. Due to the general approach, the description of the inner control loop of the TCSC is omitted and the device is seen as a variable reactance capable of changing value almost instantly when the control signal is changed. This assumption is valid since the period time of the electro-mechanical oscillations is much larger than the time constant governing the dynamic behavior of the TCSC itself. Furthermore, there is a limitation in the possible reactance values of the TCSC. These limits depend on the line current and on the amount of time the device has to be operational with the particular reactance value. The basic control strategy according to the invention is applicable also when such limitations are introduced.

The nature of inter-area oscillations is often such that there is a dominant mode of oscillation which may be poorly damped. In a power system exhibiting this characteristic, according to the invention, a simplified model consisting of two synchronous machines with interconnection transmission lines in a Center of Inertia (COI) reference frame is used to represent the entire power system. Since an adaptive control approach is used, the parameters of the system model are estimated continuously by the controller.

To determine the input and timing for the damping controller, the average and oscillatory components of the line active power are separated using a real-time estimation routine. This is done by using a Recursive Least Squares (RLS) algorithm. This algorithm is based on the assumption that the line power is composed of a zero frequency component (the average value) and a component which has a known frequency range (the power oscillation frequency). The oscillation frequency may vary within certain limits depending on the system configuration. The algorithm utilizes an expected oscillation frequency when no oscillations are at hand. At any event that causes power oscillations, the frequency parameter is adapted to the actual oscillation frequency by a PI-controller. The output of the RLS algorithm is also used as an input to the grid parameter estimation scheme indicated above.

The time instants of the discrete reactance steps must be chosen such that they coincide with peaks in the power oscillation. This gives a damping controller with a time-discretization determined by the oscillation frequency. In an embodiment of the invention, the controller is seen as a Model Predictive Controller (MPC) which solves an optimization problem at every time-step in order to determine the future steps in the CSC reactance in order to bring the system to the desired state in a limited number of time-steps.

According to the invention, a damping control approach is implemented together with the RLS algorithm described above to form a fully automatic controller for power oscillation damping and power flow control. Due to model errors, measurement errors and limitations in the achievable reactance values of the TCSC, the number of time-steps required to stabilize the oscillation may exceed two. If a remaining power oscillation is detected after a two-step damping scheme has been performed, the controller initiates another two-step damping sequence and so on. The damping controller is initiated when the RLS algorithm detects that there is a power oscillation with an amplitude exceeding a pre-defined limit present in the power system.

The transient controller is engaged if a fast positive time-derivative of the line power magnitude (at the CSC location) leading to a significant rapid change in line power is detected. When this method is used, the transient controller will be triggered in some cases which in reality are transiently stable. This may cause power oscillations which are handled by the described damping controller of the invention. In another embodiment of the invention, when real-time measurements of the (remote) voltage phase angles in one or several nodes in each of the power system areas participating in the power oscillation controlled by the CSC are available, another method of triggering the transient controller is used. This is done by estimating the COI-values of the generator angles and generator speeds in each of the power system areas. The COI-values are then used to continuously judge the risk of transient instability and to trigger the transient controller when a risk of transient instability is apparent. In this embodiment of the invention, the risk of triggering the transient controller in cases where the system is already transiently stable is reduced.

When the transient controller is triggered, it raises the compensation level of the CSC in a first step such that the CSC effective reactance is set to its maximum negative value (maximum compensation). In a subsequent step, the level of compensation is decreased to a predefined value either when the voltage phase angle separation between the two power grid areas (in COI values) attains its maximum value or, if the maximum phase angle separation exceeds 90°, when the angle separation equals 90° and the angle separation is decreasing. This is done in order to provide positive damping to the system. To conclude the transient controller operation, the post-contingency power flow set-point, which is provided to the combined fast power flow/damping controller of the invention described above is set to a high value which in an embodiment of the invention is the maximum short-term thermal limit of the CSC line (or the maximum power possible if the overload level cannot be reached). This limit is the active power level on the TCSC line which can be maintained for a time of 10-30 minutes or the time it takes for the Transmission System Operator (TSO) to re-dispatch the system to comply with the (n-1) criteria in the new operating conditions.

Following the transient controller operation, a power oscillation is commonly present. The damping controller of the invention will then be initiated. In order to maximize the system stability improvement, the controller is working to damp the oscillation at the same time as it controls the average level of line power to the set-point defined above.

Based on the above theory, a controller intended for CSC according to the invention comprises means for power oscillation damping (POD), means for first-swing stability improvement (FSW) and means for active power flow control.

In an embodiment of the invention, the first swing controller has the highest priority and inhibits the other controller parts if initiated. Generally, a fault in the system first leads to a risk of transient instability which may initiate the first-swing controller. If it is initiated, the first swing controller will perform its sequence prior to any other action of the controller. If the transient controller is not initiated or if the transient controller has been initiated and performed its sequence, the power oscillation damping controller of the invention may become active. The damping controller is initiated if a power oscillation is detected by the RLS-algorithm. The damping controller has a built-in power flow control feature which in an embodiment of the invention is used for fast control of the power on the line after a fault to further improve transient stability. Since the damping controller/fast power flow controller is only active when power oscillations are present, a separate slow PI-controller is necessary for long-term power flow control. All controllers use the CSC line active power or its estimation as input signal. The first swing controller also uses the TCSC line current as an input signal.

In a first aspect of the invention the object is achieved by a control apparatus for a controlled series compensator containing a plurality of reactance means, each having a rapid switch for connecting and disconnecting the reactance in series with an electric power transmission line, and a steady state power flow controller, wherein the control apparatus further comprises a damping controller providing on the presence of an oscillation on the transmission line a first reactance insertion on the transmission line having a first duration of time trigged by a time instant that coincides with a positive or negative peak in the power oscillation In an embodiment of the control apparatus the first duration comprises half a period of the oscillation frequency. In a further embodiment the damping controller is arranged to provide a second reactance insertion following the first reactance insertion. In yet a further embodiment the apparatus comprises a transient controller providing third reactance in presence of a transient in the active power on the transmission line. In an embodiment the third reactance is arranged to be trigged by a fast positive time-derivative of the line power magnitude (at the CSC location) leading to a significant rapid change in line power.

In a second aspect of the invention the objects are achieved by a method for controlling a controlled series compensator (CSC) on an electric power transmission line, wherein the method comprises, sensing continuously the active power through the CSC, inserting on detecting an oscillation in the active power on the transmission line a first reactance having a first magnitude during a first period of time, inserting during a second period of time following the first period of time a second reactance having a second magnitude. In an embodiment the first reactance insertion is trigged by a time instant coinciding with a positive or negative peak in the power oscillation. In a further embodiment of the method the first period of time comprises half a period of the oscillating frequency. In yet a further embodiment the average and oscillatory components of the line active power is separated using a real-time estimation routine. In an embodiment the estimation routine comprises a recursive least squares (RLS) algorithm. In an embodiment the algorithm utilizes an expected oscillation frequency when no oscillations are at hand. In yet a further embodiment the necessary magnitude reactance insertions is determined by the knowledge of the system parameters according to a model of the transmission system. In an embodiment the parameters of the system model are estimated continuously by the controller.

In yet a further embodiment the method further comprises inserting a third reactance in presence of a transient in the active power on the transmission line. In an embodiment the insertion of the third reactance is trigged by a fast positive time-derivative of the line power magnitude (at the CSC location) leading to a significant rapid change in line power.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

Parameter Estimation Technique and System Model

The nature of inter-area oscillations is often such that there is a dominant mode of oscillation which may be poorly damped. According to the invention, a grid exhibiting such inter-area oscillations is represented by a system model of the form seen in FIG. 1. A first power grid area 1 is connected to a second power grid area 2 by a transmission line. Each power grid area contains a plurality of electric rotating machines represented by a single synchronous machine. The transmission line comprises first and second reactances, and a third reactance in a parallel branch with an adjustable reactance 3. The reduced model of the power system using a Center of Inertia (COI) reference frame consists of two synchronous machines with interconnection transmission lines. This model has been shown to have an ability to represent various power grids characterized by a single dominating oscillation mode with regard to their dynamic and static properties.

In this model, the grid is characterized by two explicit parameters $X_t$ and $X_{eq}$ and the major oscillation mode angular frequency $\omega_t$ and damping k. X denotes the total reactance of the line where the variable reactance is connected including the variable part and this is assumed to be known at all times. The total number of generators in the system is here reduced to two machines with a lumped moment of inertia using a COI reference frame. The machine terminal voltage phasors characterized by the magnitudes $U_{1,2}$ and the phase angles $\theta_{1,2}$ are assumed to be well controlled and thence constant in magnitude (the classical approach). When applied to real power systems, the model can be thought of as a representation of two different grid areas with lumped moments of inertia and their connecting power lines. The load in each of the areas is modeled as a constant voltage-independent load. This simplification gives a system which can only predict the major oscillation mode of the original system. The advantage of this representation is that it makes parameter estimation in real-time possible and straight-forward. This is used in order to adapt the controller to the changing power system.

Figure 1:
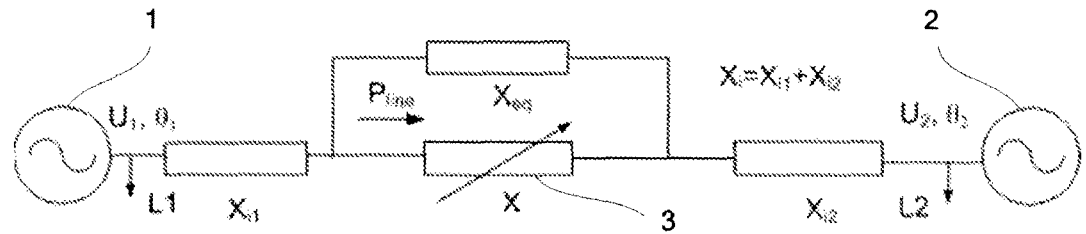
FIG. 1 is a model configuration of an electric transmission system including an adjustable reactive actuating means according to the invention.

Since an adaptive control approach is used, the parameters of the grid where the FACTS device is placed are estimated continuously by the controller according to the model of FIG. 1. The controller is time-discrete in nature making it possible for the estimation routines to be developed based on the step response of the reduced system in FIG. 1 to changes in the CSC reactance. The equations governing the step response in active power $P_{line}(t)$ on the reactance controlled line when a step in the line reactance ($\Delta X$) is performed (at $t=t_0$) can be written as $$P_{line}(t) = P_{lineStat} \quad t < t_0 \quad (0.1)$$

$$P_{line}(t) = P'_{lineStat}\left(1 + \frac{X_{tot} - X'_{tot}}{X'_{tot}} e^{-k(t-t_0)} \cos\omega'_i(t-t_0)\right) \quad t \geq t_0$$

$$P'_{lineStat} = P_{lineStat} \frac{X + X_{eq}}{X' + X_{eq}} \quad (0.2)$$

$$\omega'_i = \sqrt{\frac{U_1 U_2 \cos\theta_{stat} \omega_0}{2 X'_{tot}}\left(\frac{1}{H_1} + \frac{1}{H_2}\right)} \quad (0.3)$$

$$X_{tot} = X_i + \frac{X X_{eq}}{X + X_{eq}}. \quad (0.4)$$

$P_{lineStat}$ denotes the average active power transmitted on the TCSC line, X is the reactance of the line where the TCSC is placed (with the variable reactance included), $X_{eq}$ is the parallel reactance according to FIG. 1 and $X_{tot}$ is the total reactance between the machine representations (areas). Here, un-primed parameters are used to express the values before the step in series reactance and the primed parameters are valid after the step in series reactance such that $X'=X+\Delta X$ and $X_{tot}'$ is given with X' inserted in (0.4). Moreover, $\omega_0$ is the electrical angular frequency of the system and $\theta_{stat}$ is the voltage phase shift between the two reduced machine terminals initially. $H_1$ and $H_2$ represent the average inertia time constants of areas one and two. These equations can be used to estimate the parameters $X_i$, $X_{eq}$, k and $\omega$ if the reactance X initially and the step $\Delta X$ are known together with the step response in line power $P_{line}(t)$ measured at the TCSC. The process is reviewed shortly here. Note that (0.1) contains one time-independent term which is the average active power on the line after the change in the reactance X. This value ($P_{lineStat}'$) can be estimated from the measured curve trace of $P_{line}(t)$ and it can be used together with the value of the initial active power on the line ($P_{lineStat}$) to estimate the parameter $X_{eq}$ from (0.2).

The values of the average active power before and after the step in reactance are provided in real-time by the RLS algorithm described above. The measured instantaneous (within a few milliseconds of the step) change in $P_{line}(t)$ (expression (0.1) evaluated at $t=t_0$) can then be used together with the knowledge of $X_{eq}$ to estimate the series reactance $X_i$. The parameters k and $\omega$ can be estimated from the curve trace of $P_{line}(t)$ by determining the damping of the envelope of the curve and the frequency of oscillation. With slight modifications to the equations, estimation can also be made when the system is not in a stationary state before the step in reactance. This procedure is used in the controller according to the invention to update the grid parameters at each step in CSC reactance.

One challenge for the controller is to determine the system parameters after a contingency when grid parameters commonly change dramatically due to line disconnections at a fault clearance. Since the estimation routines are dependent on step response data, no estimation of the parameters is made prior to the first reactance step in a damping sequence. Therefore, a starting guess of the parameters is necessary in order to determine the first steps in a damping sequence. This starting guess is according to an embodiment of the invention chosen as the set of parameters which corresponds to the grid configuration case where the controllability of the inter-area oscillation mode from the FACTS device is the largest. This is generally a case where the series reactance is small and the parallel reactance is large. This approach leads to an under-estimation of the reactance step magnitudes necessary for stabilization of the system in all cases except for the case with the largest controllability.

In this way, the damping during the first steps in a damping sequence will generally be sub-optimal, thus not risking taking too large an action which may destabilize the system. Once the first step in a damping sequence has been executed, step response data is collected and the actual parameters are estimated. The input to the parameter estimation routine is both the instantaneous and the average change in line power due to the reactance step. Since the estimation of the average power on the line which is performed by the RLS algorithm requires time to stabilize, the new parameters are not evaluated until slightly before the next step in reactance is taken by the controller. This procedure repeated by the controller to update the grid parameters at each step in CSC reactance.

Due to the given time-discretization of the damping controller, the RLS algorithm must be fast enough to stabilize in the time between steps; that is in a time equal to half of the power oscillation period. This is an important restraint which gives a low limit of the necessary RLS algorithm bandwidth. To improve the system robustness to measurement errors, a "forgetting factor" is introduced which determines the weight of the old estimation values in the weighted mean of old and new parameter values which yields the current value of the grid parameters. Depending on the noise level in the system, this factor can be used to tune the controller.

Power Oscillation Damping Controller

Below are the principles of the power oscillation damping method of the invention described. To illustrate the principle, the ideal case is focused on where the power system parameters are known when the power oscillation occurs. In the controller according to the invention, the parameters are estimated using an estimation technique from information of the step responses in line active power of the TCSC line to changes in the TCSC reactance.

The power system is represented by the model described by FIG. 1. The reactances of FIG. 1 may be combined and represented by a total reactance. Further simplifications of the model are presented in FIG. 2. The model according to FIG. 2 comprises only the first power grid area 1 and the second power grid area 2 connected by a single adjustable reactance 3. Such a system can in a first order approximation be described by the system of differential equations $$\frac{d^2\theta_1}{dt^2} = \frac{\omega_0}{2H_1}\left(P_{m1} - \frac{U_1 U_2 \sin(\theta_1 - \theta_2)}{X_{tot}}\right) \quad (0.5)$$

$$\frac{d^2\theta_2}{dt^2} = \frac{\omega_0}{2H_2}\left(P_{m2} - \frac{U_1 U_2 \sin(\theta_2 - \theta_1)}{X_{tot}}\right)$$

Here $H_{1,2}$ are the inertia constants of each lumped machine representation, $\theta_{1,2}$ is the electrical angle relative to the rotating frame of each machine, $P_{m1,2}$ is the excess mechanical power in each area (the total amount of available mechanical power in the area subtracted by the load power in this area) which is assumed to be constant, $U_1$ and $U_2$ denote the voltages at the "lumped machine" terminals which are assumed to be well controlled and thus constant, $X_{tot}$ is the total reactance between the areas and $\omega_0$ is the electrical angular frequency of the grid. This is a non-linear system of equations with the state variables $\theta_1$ and $\theta_2$.

During a power oscillation in a system with two power grid areas each represented by a synchronous machine, the angular velocities of the participating machine representations are nominal at the peaks of the oscillation. At these instants, the first order time derivatives of the system state variables $\theta_{1,2}$ (the relative speeds of the lumped machines) are zero. However, since the voltage angle difference between the machines at these instants does not correspond to the stationary stable angle difference, the second order time derivatives of the system state variables $\theta_{1,2}$ are non-zero and the oscillation continues. The principle of the damping controller of the invention is to stabilize the system by changing the total reactance between machines in a discrete step at one of these Instants such that the actual angle difference corresponds to the stationary stable angle difference. In this way, ideally, no further oscillation will be possible since all the time derivatives of the system variables in the system of equations described by will be zero.

To achieve the objective of stabilization of the oscillation in one discrete reactance step, some mathematical relations must be derived, this is done below.

Figure 2:
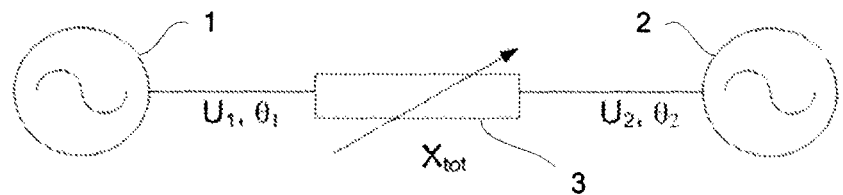
FIG. 2 is a further simplification of the model.

The total active power transmitted between the areas according to FIG. 2 can be written as $$P_{tot} = \frac{U_1 U_2 \sin(\theta_1 - \theta_2)}{X_{tot}}. \quad (0.6)$$

The average power transmitted between the areas can be assumed to be a constant, $P_{tot0}$ if the dispatch is assumed to be constant during the time of the oscillation. $P_{tot0}$ can be calculated from the mean power on the controlled line $P_{line0}$ which is estimated by the RLS algorithm using $$P_{tot0} = \frac{X_{eq} + X}{X_{eq}} P_{line0}. \quad (0.7)$$

At the instant of a peak in the power oscillation, the total power transmitted can be expressed as $$P_{TotPeak} = \frac{U_1 U_2 \sin(\theta_1 - \theta_2)}{X_{tot}}. \quad (0.8)$$

In order to bring this system to a stationary point, $X_{tot}$ must be changed to $X_{tot}'$ such that this actual angle difference gives a transmitted power which equals $P_{tot0}$. Using (0.8), this gives $$P_{tot0} = \frac{U_1 U_2 \sin(\theta_1 - \theta_2)}{X_{tot}'} = \frac{P_{TotPeak} X_{tot}}{X_{tot}'}. \quad (0.9)$$

The necessary change in $X_{tot}$, $\Delta X_{tot}$ can the be expressed as $$\Delta X_{tot} = X_{tot}' - X_{tot} = \left(\frac{P_{TotPeak}}{P_{Tot0}} - 1\right) X_{tot}. \quad (0.10)$$

Noting that (0.7) is valid both at the peak of oscillation and for the mean power values and denoting the power on the TCSC line at the peak of the oscillation by $P_{linepeak}$, (0.10) reduces to $$\Delta X_{tot} = X_{tot}' - X_{tot} = \left(\frac{P_{linePeak}}{P_{line0}} - 1\right) X_{tot}. \quad (0.11)$$

With the knowledge of the parameter values of $X_{eq}$, $X_i$ and $X$ it is now possible to calculate the necessary change in $X$, $\Delta X$, to eliminate a certain oscillation. Using (0.4) for the case before and after the step in reactance and subtracting gives $$\Delta X_{tot} = \frac{(X + \Delta X) X_{eq}}{X + \Delta X + X_{eq}} - \frac{X X_{eq}}{X + X_{eq}}. \quad (0.12)$$

Solving for $\Delta X$ in (0.12) gives $$\Delta X = \frac{\Delta X_{tot}(X^2 + 2X X_{eq} + X_{eq}^2)}{X_{eq}^2 - \Delta X_{tot} X - \Delta X_{tot} X_{eq}} \quad (0.13)$$

which is the required discrete reactance step to stabilize the power oscillation in one time-step. A shortcoming of the technique described above is the fact that potentially very large reactance steps close to or even larger than the original line reactance are necessary to alleviate a large power oscillation. This in turn gives a large change in the static power flow before and after the oscillation damping event due to the changed reactance of the line. A natural continuation of the method described above is thence to look for a solution where the reactance of the controlled line is the same before and after the power oscillation damping event. This can be achieved if a reactance step is connected to the line as before at a peak in the power oscillation. The step is then disconnected after half an oscillation period giving an equal amount of damping as the first step. In this way, the absolute value of the reactance step can be reduced since the given reactance introduces new power oscillations out of phase with the original at two instants, these two amount by the superposition principle to a removal of the original oscillation.

To determine the step required to eliminate a power oscillation in this manner some calculations must be done. The principle is to first calculate the instantaneous step response in the total power when the total reactance $X_{tot}$ is changed. Then, an oscillation starts around the mean value $P_{tot0}$ and the value of the total power at the next peak can be easily estimated knowing the damping of the system and the starting point known from the first step response. From this peak, a new reactance step in the opposite direction with the same magnitude as the first is applied. The total power after this step should then be the mean power $P_{tot0}$ to eliminate any oscillation. This demand then gives the possibility to solve for the required change in $X_{tot}$. The result is $$\Delta X_{tot} = \frac{\left(\frac{P_{totPeak}}{P_{tot0}} - 1\right)e^{-kT/2}}{1 + e^{-kT/2}} X_{tot} \qquad (0.14)$$

Here the same parameters as in the preceding section are used in addition to the variable k—the damping exponent of the system main mode of oscillation and T—the oscillation cycle time after the first step is applied. It is instructive to note that in a non-damped system (0.14) reduces to the one step case (0.10) divided by two.

As before, since the parameters $P_{totPeak}$ and $P_{tot0}$ are not known locally, they can be estimated using (0.7) which yields $$\Delta X_{tot} = \frac{\left(\frac{P_{linePeak}}{P_{line0}} - 1\right)e^{-kT/2}}{1 + e^{-kT/2}} X_{tot}. \qquad (0.15)$$

In the previous method, the required reactance step is predicted from an estimation of the value of the next line power peak after the first step in reactance. If the first reactance step is determined from the original two step version, the step in the opposite direction can be determined from a measurement of the line power at the second power peak instead. This will lead to a case where the errors in estimating the second peak from the model are eliminated. However, in this case, the second step will differ in absolute magnitude from the first and the system compensation before and after the damping action will differ. This leads to a changed statically stable power transmission before and after the step. If the model errors are small, this difference will though not be significant.

A two-step approach can also be combined with a change in the desired stationary active power flow on the controlled line. Here it is possible to select a combination of one positive step in reactance and one negative step with different magnitudes such that principal mode oscillation is damped and the stationary power flow is changed to a preset value simultaneously. This method can also be used together with the previous method using a measurement of the line power before the second reactance step in order to determine the step magnitude, but the better damping will then be achieved on the expense on a larger error between stationary set-point and actual value. The theory of this method is described below.

If the total reactance between the lumped machines in the reduced grid changes due to an adjustment in the series reactance of the FACTS device, $(\theta_1-\theta_2)$ in (0.6) will in the millisecond time-range stay constant since it is governed by the machine inertias of the two areas. Thus, since (0.6) is valid both directly before and directly after the reactance change; it follows that $$P_{p0}X_{tot0} = P_{p1}X_{tot1}. \qquad (0.16)$$

Here, $P_{p0}$ denotes the total active power transmitted directly before the step and $P_{p1}$ denotes the total active power transmitted directly after the step. Now, in order to find a valid solution to the damping problem, the steps must be taken at points in time where the oscillation has peaks. $P_{p0}$ must then be the value at a specific oscillation peak. $X_{tot0}$ denotes the initial total reactance between areas and $X_{tot1}$ is the reactance after the step. Assume that this reactance step is conducted at a low peak of a power oscillation which is oscillating around an average power flow $P_{tot0}$. The next high peak of the oscillation can be approximated as $$P'_{p1} = (P_{tot0} - P_{p1})e^{-kT/2} + P_{tot0}. \qquad (0.17)$$

Here the damping exponent is denoted by k and the cycle time of the oscillation after the reactance step is denoted by T. If a new reactance step is applied at this peak of the oscillation changing the total reactance to $X_{tot2}$, the total transmitted power after this step must equal the stationary value $P_{tot0}$ in order to theoretically eliminate the oscillation as it is explained above. Basically, the value of the transmitted power between areas is forced to the stationary value by changing the reactance at a point in time where the speeds of both lumped machine representations are already nominal. Thus, both state variables and their time derivatives are at their stationary values and no oscillation can longer occur. Now, (0.16) and (0.17) yield $$\left(\left(P_{tot0} - \frac{P_{p0}X_{tot0}}{X_{tot1}}\right)e^{-kT/2} + P_{tot0}\right)X_{tot1} = P_{tot0}X_{tot2} \qquad (0.18)$$

From the basic model, the relation between the stationary active power on the controlled line before and after a reactance step can be derived as $$P_{xstep} = P_{xstat}\left(\frac{X_{eq} + X}{X_{eq} + X + \Delta X}\right). \qquad (0.19)$$

Here $P_{xstat}$ denotes the average active power on the controlled line before the step and $P_{xstep}$ denotes the average power after the step. X is the effective reactance of the controlled line before the step including any series compensation, $X_{eq}$ is the parallel reactance as defined in the reduced model above and $\Delta X$ is the series reactance step at the FACTS device. If a set-point for the active power on the controlled line is known as $P_{xsp}$, then with the knowledge of the system parameters $X_{eq}$, X and the starting point average active power on the line $P_{xstat}$, the necessary step in reactance $\Delta X$ to reach the set-point can be calculated from (0.19), setting $P_{xstep} = P_{xsp}$. Using this value together with the expression for the total reactance between the reduced model machines after a reactance step $$X_{tot} = X_i + \frac{(X + \Delta X)X_{eq}}{X + \Delta X + X_{eq}}, \qquad (0.20)$$

the total reactance $X_{tot2}$ after the damping action can be calculated, provided that $X_i$ is known. Using $X_{tot2}$, it is possible to calculate the parameter $X_{tot1}$ in (0.18). $P_{tot0}$ can be derived from the mean value of the controlled line power $P_{line0}$ provided in real-time by the RLS algorithm using (0.7). Here $P_{line}$ is the power on the controlled line and $P_{tot}$ is the total power transmitted between the areas. This expression is valid both at steady state and during reasonably slow dynamics. The relation can also be used to calculate $P_{p0}$ from the measured peak value of the power on the controlled line $P_{xp0}$. The output of the above derivation is the total reactance after the first reactance step $X_{tot1}$ and the reactance after the second step $X_{tot2}$ to fulfill the demands on post-damping active power set-point and the demand to theoretically eliminate the oscillation in two steps. Using (0.20), it is now possible to determine the steps in reactance $\Delta X_1$, and $\Delta X_2$ that should be applied to the controlled line at the FACTS device in order to fulfill the demands.

Figure 3:
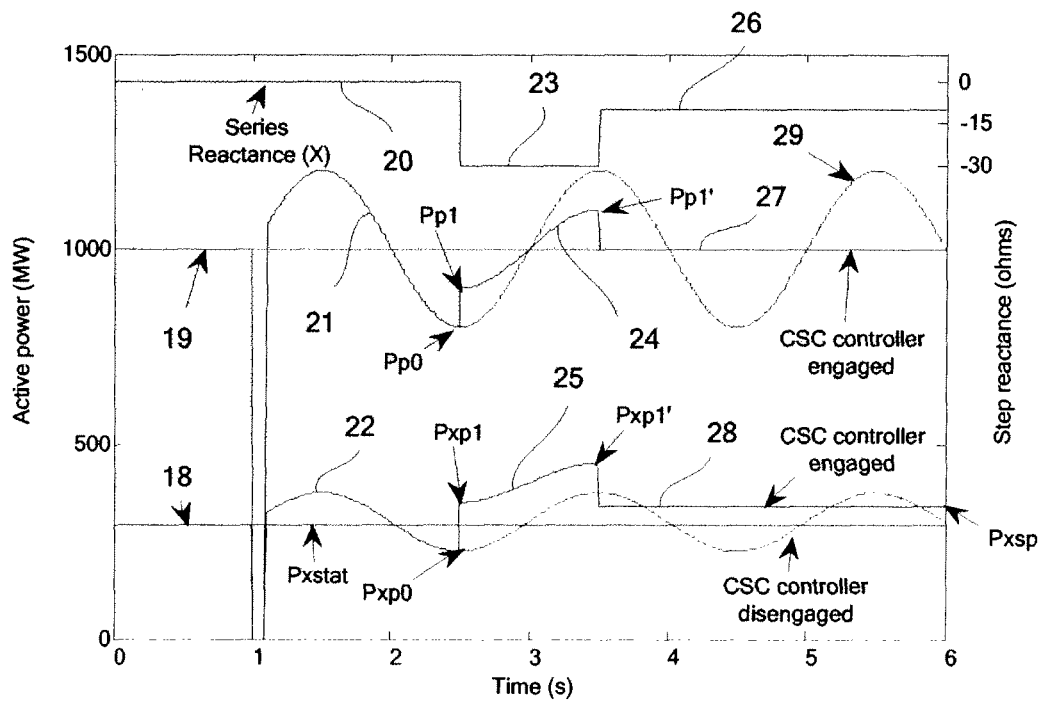
FIG. 3 is a time window indicating the ideal traces of power flow on the TCSC line as well as the total power flow between grid areas when a power oscillation is present and a two-step power oscillation damping strategy accompanied by a change in line power according to the invention is applied

A sketch of ideal curve traces during a two-step damping process where a power oscillation is initiated by a fault (at t=1s, cleared at t=1.1s) is seen in FIG. 3. The figure illustrates ideal curve trances of power oscillation damping in two steps with power set point. The top curve 20 illustrates the value (right side) of the series reactance and the duration of the first step 23 (t=2.5s-t=3.5s), and the second step 26 (t=3.5-->). The mid curve 19 illustrates the total transmitted power before a fault and after a fault 21. The lower curve 18 is the line power before the fault and after the fault 22 at the CSC location. In the diagram solid curves indicates results of the damping controller and dotted line the result if the damping controller had been disengaged. Hence the result of the first reactance insertion 23 is spotted as curve parts 24 and 25 and the effect of the second reactance insertion is spotted in the curve parts 27 and 28. The non-engagement of the series reactance is illustrated by the total transmitted power 29.

Common for all of the damping controllers based on the principles described above is that once a damping sequence to eliminate the power oscillation has been performed, a residual oscillation may still be present due to different types of errors. The damping process will then, in one embodiment of the controller according to this invention, be repeated with the current values of the input parameters and system model parameters which are updated in real-time by the system identification part 6 and the RLS algorithm 7 until the power oscillation amplitude has been reduced below a certain pre-defined level.

As mentioned earlier, one challenge for the controller is to determine the system parameters $X_i$, $X_{eq}$, k and ω after a contingency when grid parameters commonly change dramatically due to line disconnections at fault clearance. Since the estimation routines for the parameters $X_i$ and $X_{eq}$ are dependent on step response data, no estimation of these parameters can be made prior to the first reactance step in a damping sequence. Therefore, a starting guess of the parameters is necessary in order to determine the first steps in a damping sequence. This starting guess is in an embodiment of the invention chosen as the set of parameters which corresponds to the grid (n-1) configuration case where the controllability of the inter-area oscillation mode from the FACTS device is the largest. This approach leads to an under-estimation of the reactance step magnitudes necessary for stabilization of the system in all cases except for the case with the largest controllability. In this way the damping during the first steps in a damping sequence will generally be sub-optimal but the controller will not risk taking to large action, destabilizing the system. The damping performance will then improve significantly after the first reactance step when the system identification algorithm has collected system response data to work with.

Transient Stability Controller

The risk of first-swing instabilities in a power system may be the dimensioning factor when the allowed maximum power transfer of an interconnecting line in the system is determined since a high level of power transfer leads to a lower margin to transient instability. If a FACTS device such as a CSC is installed in one of the interconnecting lines connecting two areas, the device can be used to improve the margin to transient instability. The transient control strategy according to an embodiment of the invention during a typical power system fault case is described below.

Figure 4:
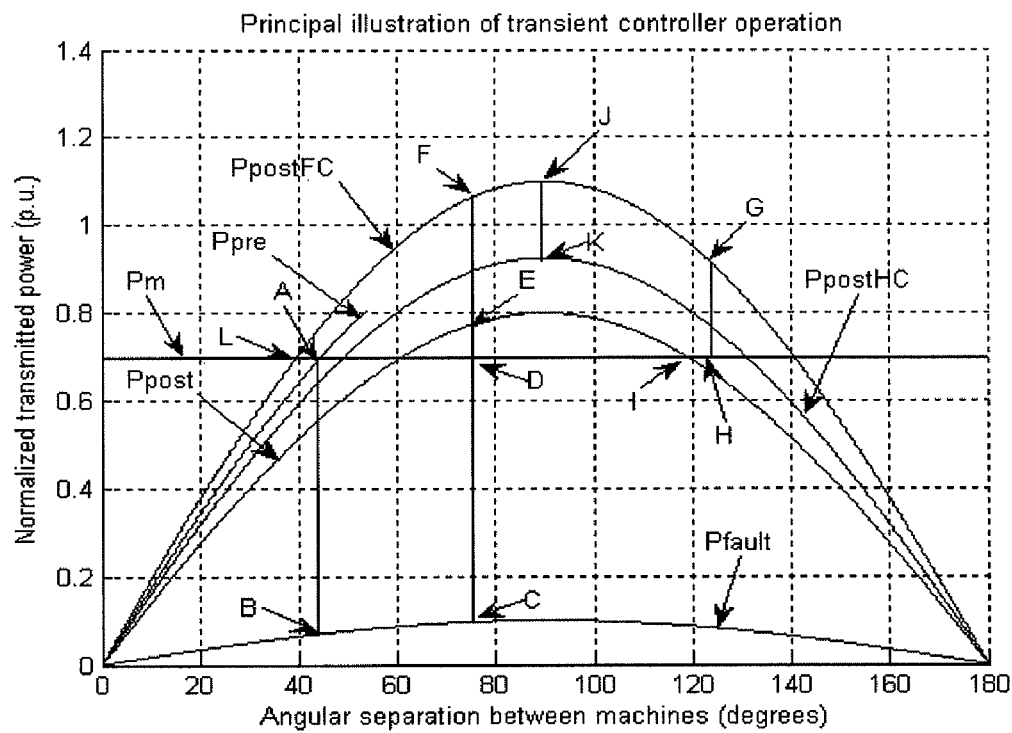
FIG. 4 is a principal illustration of a transient controller operation according to the invention.

A severe contingency such as a three-phase short circuit in a power system with two interconnected areas may lead to a case such as the one depicted in FIG. 4. The horizontal line $P_m(\delta)$ in the figure represents the initial power delivered from the sending to the receiving area which equals the excess mechanical power delivered to the generators in the sending area. This power is assumed to be constant during the event. The sinusoidal curves represent the transmitted power over the interconnecting line for different values of the intertie reactance as a function of the voltage phase angle separation between the areas. The function of the transient controller is described by means of the equal-area criterion below.

Assume that the system starts from stationary state at A and that the P-δ relationship is described by $P_{pre}(\delta)$. Then a severe fault interrupts the transmission and the transmitted power drops to a small value on the curve $P_{fault}(\delta)$ at B. The generators in the sending end are now accelerated with respect to the machines in the receiving end and the angle separation increases. At C, the breakers have isolated the faulted line and the system resumes transmitting power according to $P_{post}(\delta)$. With no action of the TCSC, the system will move C-D-E and then towards I on $P_{post}(\delta)$. Since the area bounded by D-E-I is smaller than the area A-B-C-D, the system exhibits transient instability and it will fall out of phase. If on the other hand, the TCSC is engaged at point C, maximizing the compensation, the system will move on the path C-D-E-F-G on $P_{postFC}(\delta)$. and then turn back since the areas A-B-C-D and D-F-G-H are equal. At this point, the system has survived the first-swing and a power oscillation is initiated. If the system damping is positive it will oscillate until it is in a stationary state if no further action from the TCSC is taken. It is important to note that the system may still be transiently instable if the compensation level is reduced. Since the system parameters are unknown immediately after a contingency, the control strategy for transient stability improvement cannot be based of the system model used for the damping controller. Instead, a pre-programmed response during the first swing is used. The transient strategy of this invention is the following:

1. The transient controller is engaged if a fast positive time-derivative of the line power magnitude (at the TCSC location) leading to a significant rapid change in line power is detected. The reactance of the TCSC is set to its minimum $X_{TCSC}=X_{TCSCmin}$. (the maximum capacitive reactance). As mentioned above, the transient controller may also be triggered using remote system information if such information is available.

2. To provide positive damping to the system, the level of compensation should be decreased at some point provided that the system has survived the first swing by turning back at G. This should ideally be done at the turning point G provided that the level of transmitted power after the change in compensation is larger than the mechanical power level. If the transmitted power after the compensation change does not fulfill this demand, the angle separation will increase further and instability will occur. To avoid this risk of instability and to make the controller more robust, the controller according to an embodiment of this invention decreases the compensation level after turning at G at the point J ($\delta$=90°) where the transmitted power for all tie reactances is maximized. If the fault case is such that the angle difference never exceeds $\delta$=90°, the transition is made at the point where $\delta$ reaches its maximum value (this case is not illustrated).

3. The choice of the level of compensation after the reactance change at point J is not trivial. If the level is chosen to low it may push the power curve under the mechanical level resulting in instability for a severely strained power system. If the level is chosen to high it will provide insufficient damping to the system in the following damping reactance steps. As a compromise, in an embodiment of the controller, the compensation level is reduced to $X_{TCSC}=X_{TCSCmin}/2$ when the system passes point J on the way back from its turning point at G. After this change in compensation, the system follows $P_{postHC}(\delta)$ in this case. In this way the new decelerating area G-J-K-A-H is significantly reduced from the area G-J-F-L-H which would be the case if no change in compensation is applied. This provides positive damping to the system. If the angle separation between areas is not available in real-time at the FACTS device location, the time instant for the change in compensation can be determined from measurement of the FACTS line current and the line active power.

The power on the line has a local maximum at point J but since we also demand that $d\delta/dt \leq 0$ at point J it is not straightforward to use the line power as the only input signal. Due to the non-linearity of the system, the active power on the line will, when $\delta$>90°, pass two maxima during the first swing after the contingency, one with $d\delta/dt$>0 and one with $d\delta/dt$<0. The current on the line is monotonously increasing with the angle $\delta$ and it can be used in order to distinguish between the cases with $\delta$<90° and those that pass $\delta$=90° in the first swing. The strategy used in an embodiment of the invention is to measure the RMS current when the RLS algorithm 7, represented in FIG. 5, detects the first peak in the line power. The compensation is then kept high until the current has decreased below this current level, ensuring that $d\delta/dt$<0. The system will then be at point J, moving towards F or in the case of a fault where $\delta$<90°, the angle separation will be at its turning point where $d\delta/dt$=0.

4. Following the transient controller operation, the damping controller is commonly initiated. In an embodiment of the invention, in order to maximize the system stability improvement, the controller is working to damp the oscillation at the same time as it controls the average level of line power to a pre-determined short-term thermal overload limit $P_{limit}$ (or the maximum power possible if the overload level cannot be reached). This limit is the active power level on the TCSC line which can be maintained for a time of 10-15 minutes or the time it takes for the Transmission System Operator (TSO) to re-dispatch the system to comply with the N-1 criteria in the new operating conditions.

The benefits of increasing the average level of the line active power to the short-term thermal limit in the case of a severe contingency are several.

The strategy will help the system to remain transiently stable in the subsequent swings provided that the first-swing does not give rise to instability by maximizing the decelerating area. Ideally the raised compensation will guarantee the transient stability of the following power swings.

The strategy will enable the system to operate in cases with high intertie reactance which may not be stable in a stationary sense. If such a system includes an inter-tie TCSC, the unit is used to increase the series compensation after the contingency. This enhances the transfer capacity of systems which are limited in capacity by the risk of transient instability.

A higher average compensation level during the power oscillation damping scheme reduces the risk for the system to oscillate in the range where the voltage angle separation between the power system areas exceeds 90° since the average angle separation during the power oscillation is reduced. This makes damping schemes relying on linearization of the system equations, such as the one of this invention, more effective.

The strategy will reduce the risk of voltage instability in the system.

Figure 5:
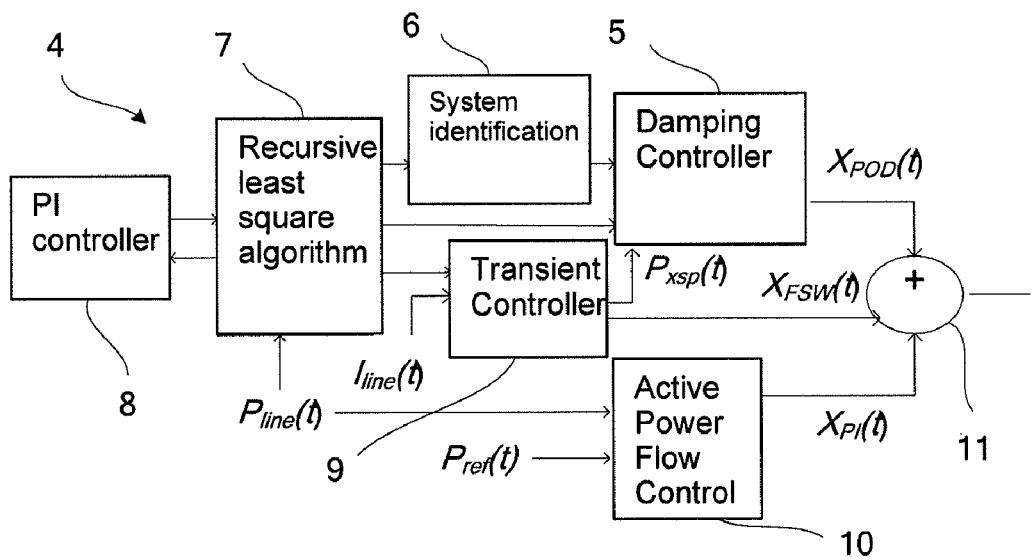
FIG. 5 is a principal schematic layout of the main controller.

An embodiment of a main controller 4 according to the invention is shown in FIG. 5. The controller comprises a damping controller 5 comprising power oscillation damping (POD) and fast power flow control, a transient controller 9 comprising a first-swing stability improvement (FSW) and an active power flow control 10 comprising a slow PI controller. Since the damping controller is only active when power oscillations are present, the separate slow PI-controller 8 is necessary for long-term power flow control (to control the line power to P.sub.ref). These controllers contribute with the terms X.sub.POD, XF.sub.SW and X.sub.PI to the reactance of the CSC-X.sub.CSC (see FIG. 5).

Figure 6:
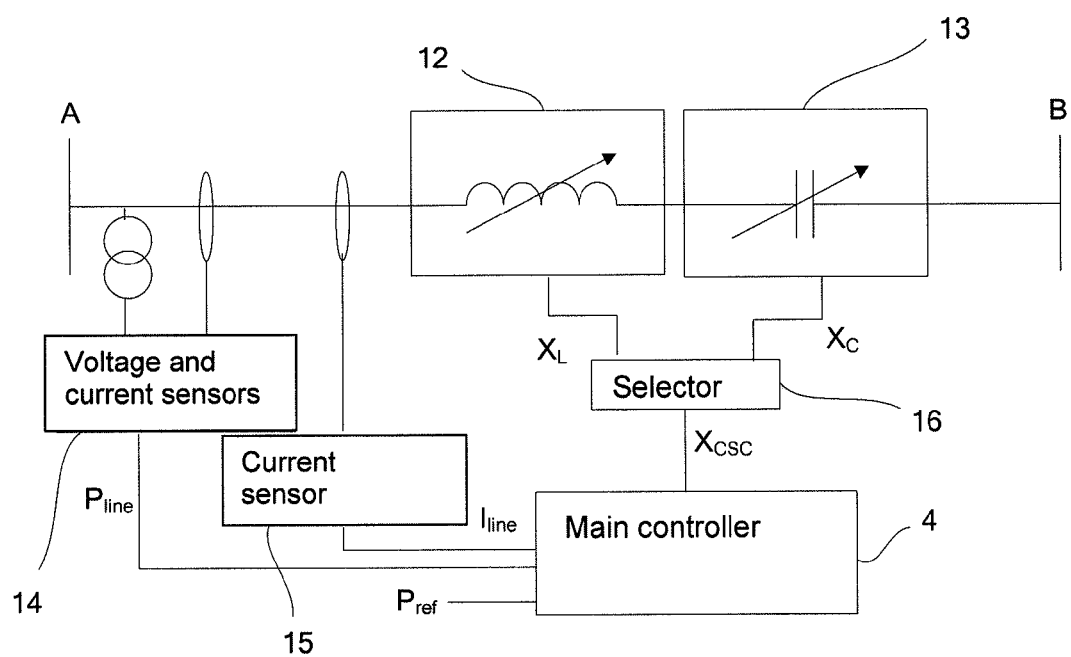
FIG. 6 is a principal schematic layout of the controllable series compensator with controller connected in a power system between nodes A and B.

A controlled series compensator (CSC) containing the controller 4 according to the invention is shown in FIG. 6. The CSC is connected between a first node A and a second node B and comprises a first adjustable reactance 12, a second adjustable reactance 13 and a main controller 4. In the embodiment shown the first adjustable reactance comprises an adjustable capacitance and the second adjustable reactance comprises an adjustable inductance. The CSC comprises first means 14 with voltage and current sensors for measuring the line power and second means 15 with a current sensor for measuring the line current. To select the proper reactance the controller also comprises a selector 16. However not shown in FIG. 6 the controller comprises computer means and memory means for storing and for effectuating a computer program containing instructions for the computer to evaluate the method of controlling the CSC.

The controller is also used to control any device capable of varying the line series reactance connected to the power grid. The device may be a unit capable of continuous variation of the line series reactance magnitude like a TCSC or it may be a device capable of assuming a limited number of different reactance values like a TSSC.

Although favorable the scope of the invention must not be limited by the embodiments presented but contain also embodiments obvious to a person skilled in the art. For instance the TSSC or the TCSC may be exchanged by any reactance means having a rapid connection and disconnection time.

The invention claimed is:

1. A control apparatus for a controlled series compensator, the apparatus comprising:
   a plurality of reactance elements, each having a rapid switch for connecting and disconnecting a reactance in series with an electric power transmission line,
   a steady state power flow controller configured to monitor active power and detect oscillations of power transmitted on the power transmission line, and
   a damping controller providing on the presence of a power oscillation on the transmission line a first reactance insertion on the transmission line having a first duration of time trigged at a time instant that coincides with a peak in the power oscillation.

2. The apparatus according to claim 1, wherein the first duration comprises half a period of the oscillation frequency.

3. The apparatus according to claim 1, wherein the damping controller is arranged to provide a second reactance insertion following the first reactance insertion.

4. The apparatus according to claim 3, wherein the second reactance insertion comprises a predetermined level of compensation.

5. The apparatus according to claim 1, further comprising:
a transient controller providing third reactance in presence of a transient in the active power on the transmission line.

6. The apparatus according to claim 5, wherein the third reactance is arranged to be triggered by a positive time-derivative of the line power magnitude at the controlled series compensator location leading to a rapid change in line power.

7. The apparatus according to claim 5, wherein the third reactance is arranged to be triggered by a remote signal.

8. A method for controlling a controlled series compensator on an electric power transmission line, the method comprising:
sensing continuously an active power through the controlled series compensator,
inserting on detecting an oscillation in the active power on the transmission line a first reactance having a first magnitude during a first period of time, and
inserting during a second period of time following the first period of time a second reactance having a second magnitude,
wherein the first reactance insertion is trigged at a time instant coinciding with a peak in the power oscillation.

9. The method according to claim 8, wherein the first period of time comprises half a period of the oscillating frequency.

10. The method according to claim 8, wherein average and oscillatory components of the line active power is are separated using a real-time estimation routine.

11. The method according to claim 10, wherein the estimation routine comprises a recursive least squares algorithm.

12. The method according to claim 11, wherein the algorithm utilizes an expected oscillation frequency when no oscillations are at hand.

13. The method according to claim 8, wherein the first reactance magnitude is determined from local measurements at the apparatus location, and the second reactance value comprises a predetermined value.

14. The method according to claim 8, wherein the necessary reactance magnitude insertions are determined by knowledge of system parameters according to a model of the transmission system.

15. The method according to claim 14, wherein the parameters of the system model are estimated continuously by a controller.

16. The method according to claim 8, further comprising:
inserting a third reactance in presence of a transient in the active power on the transmission line.

17. The method according to claim 16, wherein the insertion of the third reactance is triggered by a positive time-derivative of the line power magnitude at the controlled series compensator location leading to a rapid change in line power.

18. A computer program product, comprising:
a non-transitory computer readable medium; and
computer program instructions recorded on the computer readable medium and executable by a processor to carry out a method for controlling a controlled series compensator on an electric power transmission line, the method comprising sensing continuously an active power through the controlled series compensator, inserting on detecting an oscillation in the active power on the transmission line a first reactance having a first magnitude during a first period of time, and inserting during a second period of time following the first period of time a second reactance having a second magnitude, wherein the first reactance insertion is trigged at a time instant coinciding with a peak in the power oscillation.

19. The computer program product according to claim 18, wherein the computer program instructions are further for proving the computer program instructions at least in part over a network.

20. A computer program product according to claim 18, wherein the network is the Internet.

* * * * *